United States Patent
Rudick et al.

(10) Patent No.: US 9,150,366 B2
(45) Date of Patent: Oct. 6, 2015

(54) AUTOMATED DISPENSING SYSTEM WITH MAGNETIC DRIVE DEVICE

(71) Applicant: The Coca-Cola Company, Atlanta, GA (US)

(72) Inventors: Arthur G. Rudick, Atlanta, GA (US); Simon Andrew English, Croydon North (AU)

(73) Assignee: The Coca-Cola Company, Atlanta, GA (US)

( * ) Notice: Subject to any disclaimer, the term of this patent is extended or adjusted under 35 U.S.C. 154(b) by 64 days.

(21) Appl. No.: 13/960,842

(22) Filed: Aug. 7, 2013

(65) Prior Publication Data

US 2014/0041992 A1    Feb. 13, 2014

Related U.S. Application Data

(60) Provisional application No. 61/680,747, filed on Aug. 8, 2012.

(51) Int. Cl.
*B65G 54/02*    (2006.01)

(52) U.S. Cl.
CPC .............. *B65G 54/02* (2013.01); *B65G 54/025* (2013.01)

(58) Field of Classification Search
CPC ....................................................... B65G 54/02
USPC ............... 198/350, 377.05, 377.09, 439, 619, 198/690.1, 750.13, 805; 294/88, 115, 294/119.1, 192
See application file for complete search history.

(56) References Cited

U.S. PATENT DOCUMENTS

| | | | | |
|---|---|---|---|---|
| 1,811,299 A | * | 6/1931 | Brockhaus, Jr. | 269/242 |
| 4,319,441 A | | 3/1982 | Credle | |
| 4,423,998 A | * | 1/1984 | Inaba et al. | 414/730 |
| 4,579,380 A | * | 4/1986 | Zaremsky et al. | 294/119.1 |
| 5,000,345 A | | 3/1991 | Brogna et al. | |
| 5,458,387 A | * | 10/1995 | Conway et al. | 294/100 |
| 5,816,385 A | * | 10/1998 | Ootsuki et al. | 198/690.1 |
| 6,076,875 A | * | 6/2000 | Neff et al. | 294/207 |
| 6,084,326 A | * | 7/2000 | Nagai et al. | 310/80 |
| 6,315,108 B1 | * | 11/2001 | Bootsman et al. | 198/690.1 |
| 6,571,934 B1 | * | 6/2003 | Thompson et al. | 198/619 |
| 6,626,476 B1 | * | 9/2003 | Govzman et al. | 294/119.1 |

(Continued)

FOREIGN PATENT DOCUMENTS

DE    31 11 896 C1    12/1982
EP    0 018 733 B1    4/1984

OTHER PUBLICATIONS

SMC Corporation of America; Title: CDY1S, Magnetically Coupled Rodless Cylinder, Slide Bearing, Auto Switch, Dated Jul. 10, 2012, pp. 1 & 2.
SMC Corporation of America; Title: Slider Type/Slide Bearing Series CY1S, pp. 1189-1200.
SMC Corporation of America; Title: Slider Type/Ball Bushing Bearing Series CY1L, pp. 1201-1211.

(Continued)

*Primary Examiner* — Douglas Hess
(74) *Attorney, Agent, or Firm* — Sutherland Asbill & Brennan LLP

(57) ABSTRACT

The present application thus provides a magnetic drive system for maneuvering a container across a deck. The magnetic drive system may include a puck to support the container on the deck, a driven magnet positioned about the puck, an actuator positioned under the deck, and a drive magnet positioned about the actuator for movement therewith.

20 Claims, 16 Drawing Sheets

(56) References Cited

U.S. PATENT DOCUMENTS

| | | | |
|---|---|---|---|
| 7,121,400 B2 * | 10/2006 | Fandella | 198/619 |
| 7,503,566 B2 * | 3/2009 | Martinis | 279/137 |
| 7,597,187 B2 * | 10/2009 | Bausenwein et al. | 198/619 |
| 7,757,896 B2 | 7/2010 | Carpenter et al. | |
| RE41,760 E * | 9/2010 | Thompson et al. | 198/619 |
| 7,882,980 B1 | 2/2011 | Horn et al. | |
| 8,206,144 B2 * | 6/2012 | Ng et al. | 425/526 |
| 8,297,671 B2 * | 10/2012 | Knieling et al. | 294/90 |
| 2001/0038017 A1 | 11/2001 | Davis | |

OTHER PUBLICATIONS pondliner.com; Title: Mag Drive Pumps, Date Jul. 10, 2012, pp. 1 & 2.

Del-Tron Precision, Inc.; Title: High Speed Belt Drive Actuators, Date: Jul. 10, 2012, Pg. 1.

Del-Tron Precision, Inc.; Title: DB Series Belt Drive Actuators, High Speed Linear Actuators, pp. 1-16.

* cited by examiner

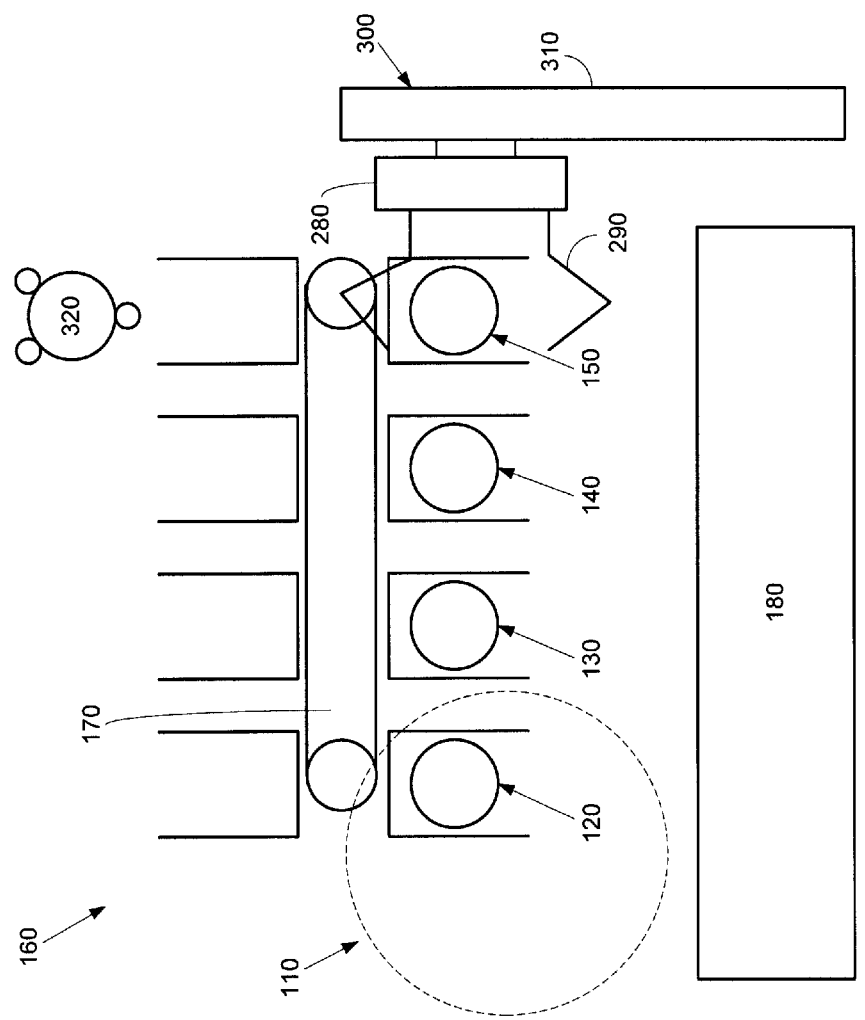

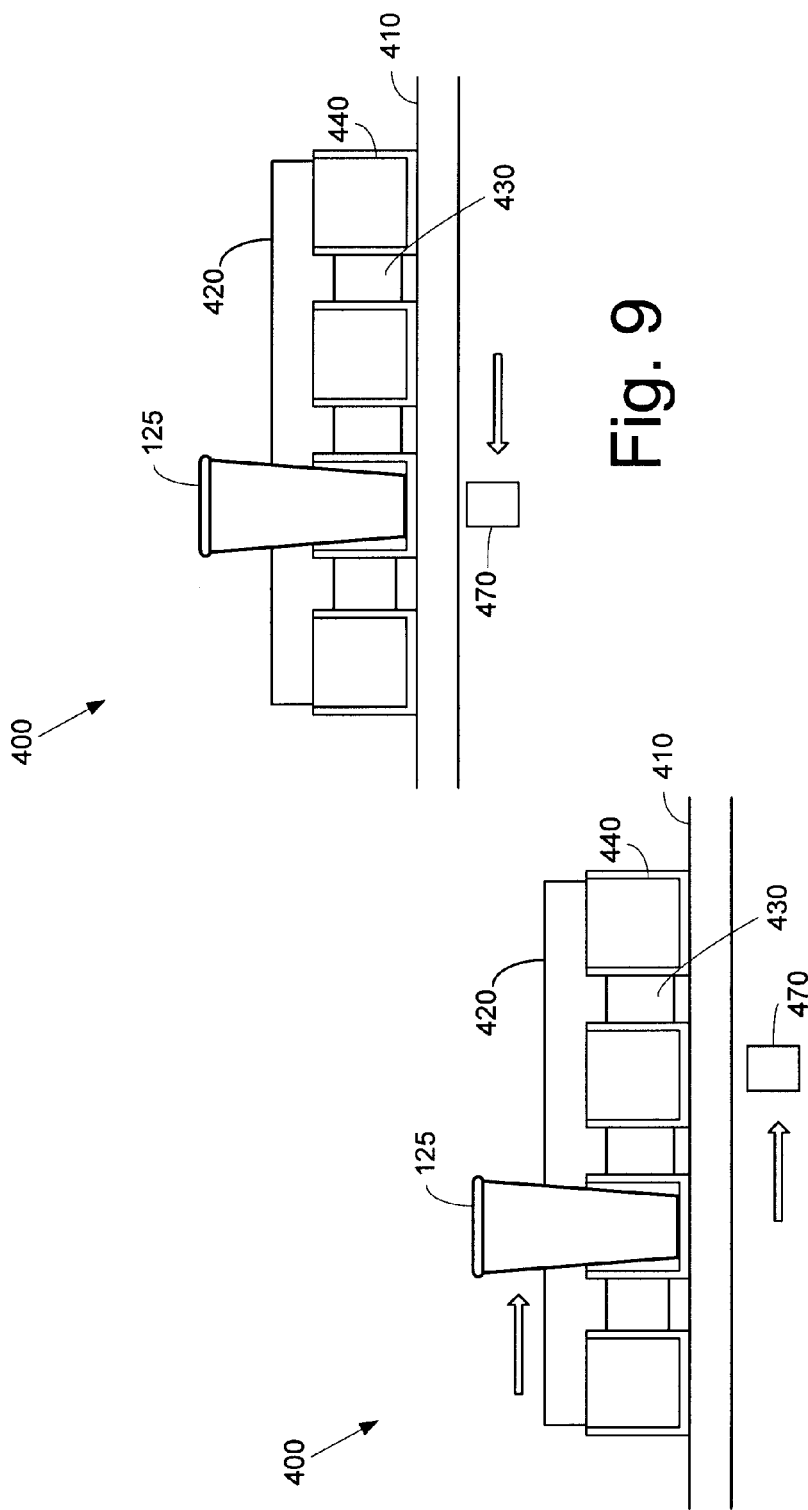

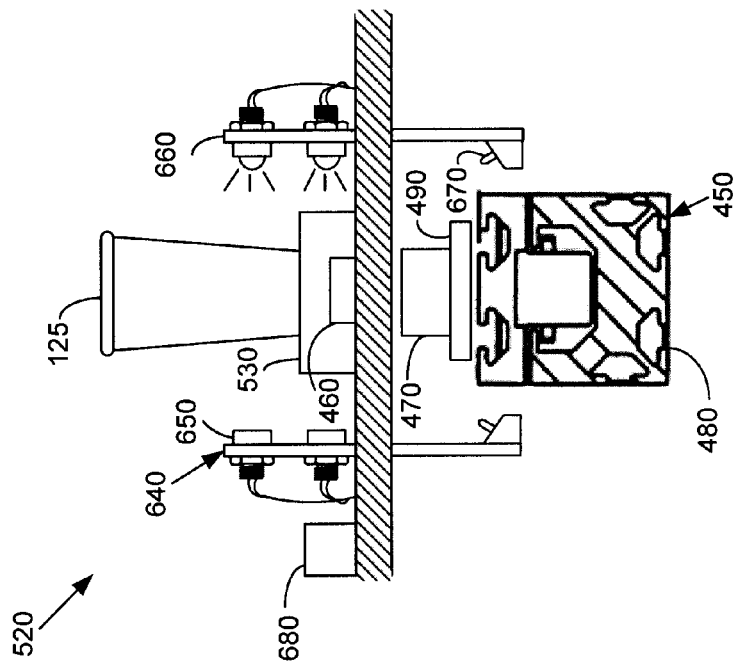
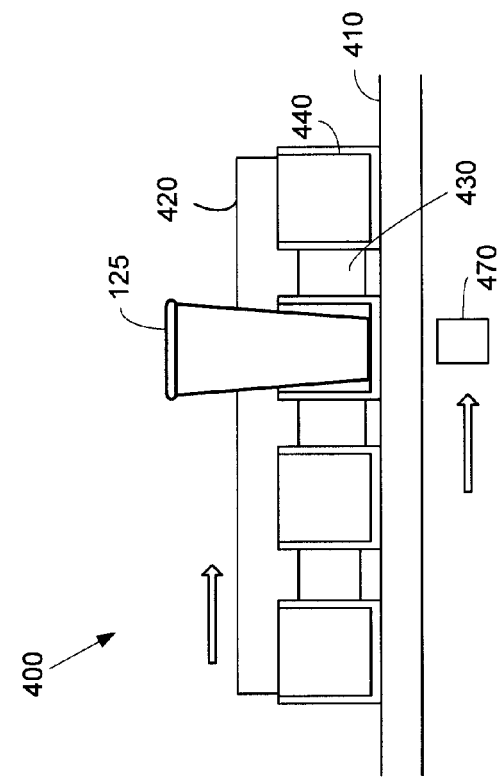
Fig. 11
Fig. 10

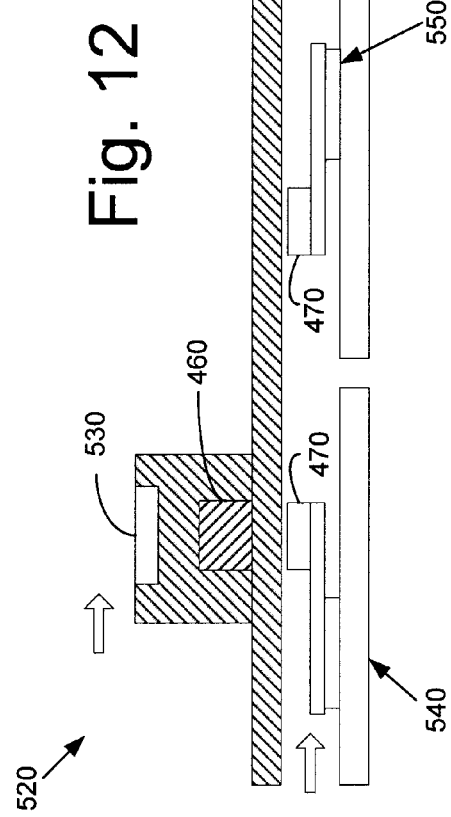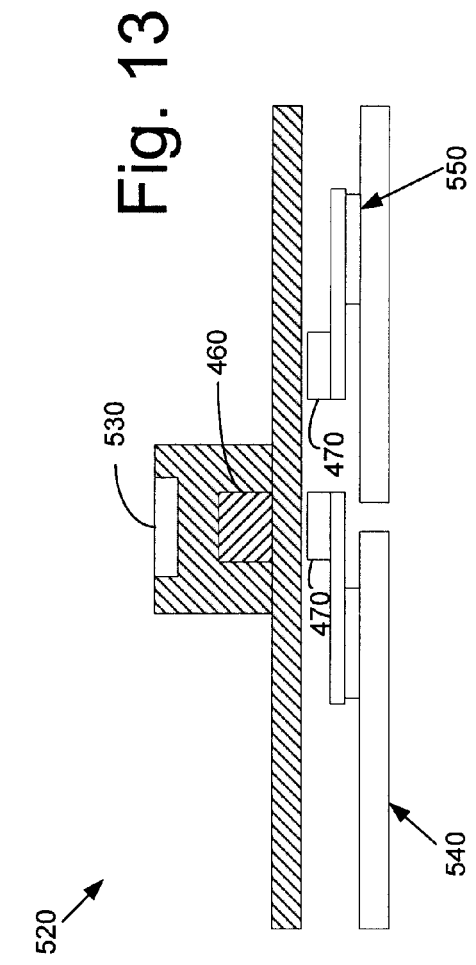

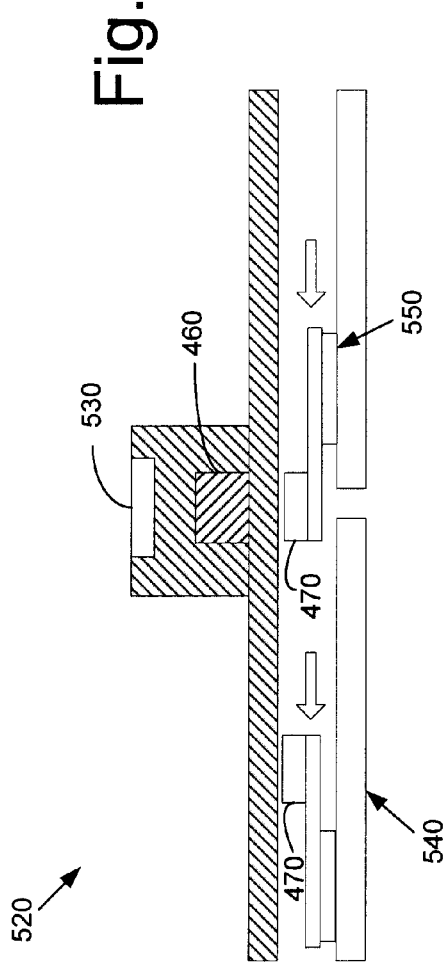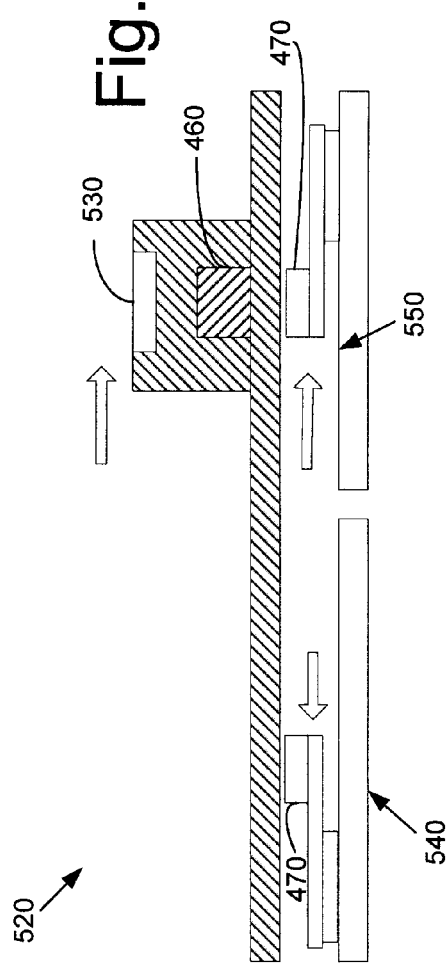

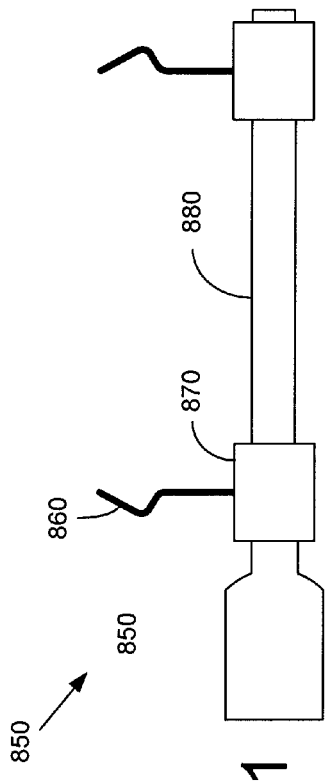
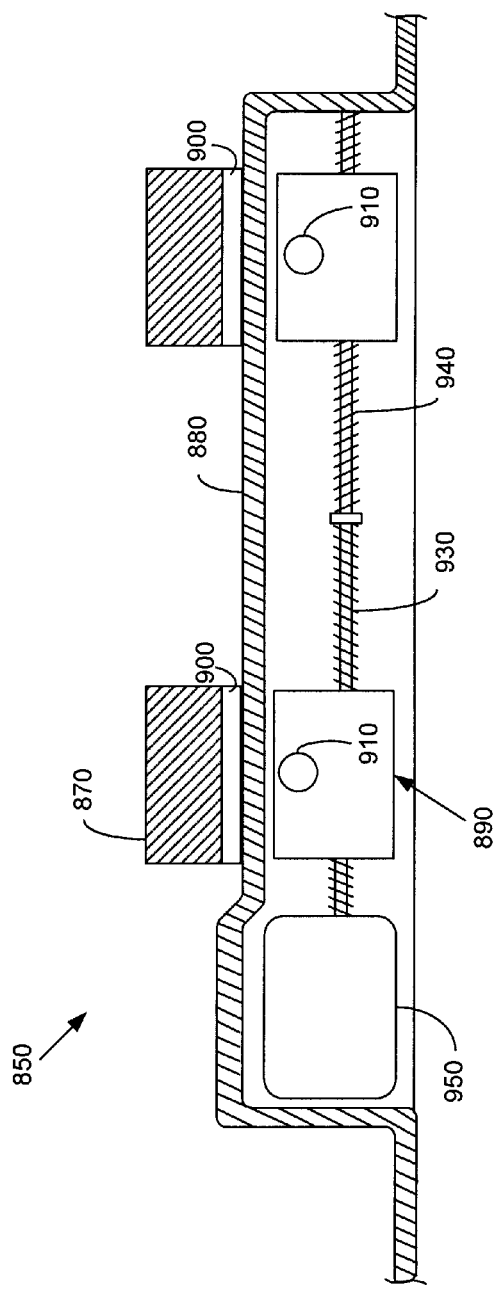

AUTOMATED DISPENSING SYSTEM WITH MAGNETIC DRIVE DEVICE

RELATED APPLICATIONS

The present application claims priority to U.S. Provisional Application Ser. No. 61/680,747, filed on Aug. 8, 2012. U.S. Provisional Application Ser. No. 61/680,747 is incorporated herein by reference in full.

TECHNICAL FIELD

The present application and the resultant patents relate generally to dispensing systems and more particularly relate to an automated beverage dispensing system with magnetic drive devices for precise container transport therein with easy cleaning.

BACKGROUND OF THE INVENTION

Beverage dispensers traditionally combine a diluent such as water with a beverage base such as a syrup and the like. These beverage bases generally have a dilution or a reconstitution ratio of about three to one (3:1) to about six to one (6:1). The beverage bases usually come in large bag-in-box containers that require significant amounts of storage space and may need to be refrigerated. These storage requirements often necessitate the need to position these bag-in-box containers away from the dispenser in a backroom with a long supply line. Each bag-in-box container usually only holds a beverage base for a single type or flavor of beverage such that multiple bag-in-box containers may be required to provide the dispenser with a variety of beverage options.

Resent improvements in beverage dispensing technology have focused on the use of micro-ingredients. With micro-ingredients, the traditional beverage bases may be separated into their constituent parts at much higher reconstitution ratios. These micro-ingredients then may be stored in much smaller packages and stored closer to, adjacent to, or within the beverage dispenser itself. The beverage dispenser preferably may provide the consumer with multiple beverage options as well as the ability to customize his or her beverage as desired.

Beverage dispensers incorporating such highly concentrated micro-ingredients have proven to be highly popular with consumers. One example of the use of such micro-ingredients is shown in commonly owned U.S. Pat. No. 7,757,896 B2 to Carpenter, et al., entitled "BEVERAGE DISPENSING SYSTEM." U.S. Pat. No. 7,757,896 B2 is incorporated herein by reference herein in full. Likewise, such micro-ingredient technology is incorporated in the highly popular "FREESTYLE®" refrigerated beverage dispensing units provided by The Coca-Cola Company of Atlanta, Ga. The "FREESTYLE®" refrigerated beverage dispensing units may dispense over 125 brands and flavors without the need for extensive storage space.

There is now a desire to incorporate such micro-ingredient technology for use behind the counter or for crew serve applications in venues such as quick service restaurants and the like. The use of such micro-ingredient technology would allow the venue to offer dozens of different beverages without significant storage requirements in a fast and efficient manner.

SUMMARY OF THE INVENTION

The present application and the resultant patent thus provide a magnetic drive system for maneuvering a container across a deck. The magnetic drive system may include a puck to support the container on the deck, a driven magnet positioned about the puck, an actuator positioned under the deck, and a drive magnet positioned about the actuator for attracting the driven magnet and for movement therewith.

The present application and the resultant patent further provide a beverage dispensing system for filling a container. The beverage dispensing system may include a deck, a number of stations positioned on the deck, and a magnetic drive system for maneuvering the container on the deck. The magnetic drive system may include a driven magnet positioned about the container and a drive magnetic positioned underneath the deck.

The present application and the resultant patent further provide a magnetic drive system for centering a container on a deck. The magnetic drive system may include a pair of gripper jaws positioned on the deck, a pair of driven magnets positioned about the pair of gripper jaws, a pair of drive magnets positioned under the deck, and a pair of drive screws to maneuver the pair of drive magnets.

These and other features and improvements of the present application and the resultant patent will become apparent to one of ordinary skill in the art upon review of the following detailed description when taken in conjunction with the several drawings and the appended claims.

BRIEF DESCRIPTION OF THE DRAWINGS

FIG. 3 is a top view of portions of the beverage dispensing system of FIG. 1.

FIG. 8 is a plan view of the magnetic drive system of FIG. 4 in motion.

FIG. 9 is a plan view of the magnetic drive system of FIG. 4 in motion.

FIG. 10 is a plan view of the magnetic drive system of FIG. 4 in motion.

FIG. 11 is a partial side cross-sectional view of an alternative embodiment of a magnetic drive system as may be described herein.

FIG. 12 is a plan view of the magnetic drive system of FIG. 11 in motion.

FIG. 13 is a plan view of the magnetic drive system of FIG. 11 in motion.

FIG. 14 is a plan view of the magnetic drive system of FIG. 11 in motion.

FIG. 15 is a plan view of the magnetic drive system of FIG. 11 in motion.

FIG. 21 is a plan view of a jaw centering mechanism for use with the beverage dispensing system of FIG. 17.

FIG. 22 is a side cross-sectional view of the jaw centering mechanism of FIG. 21.

DETAILED DESCRIPTION

Figure 1:
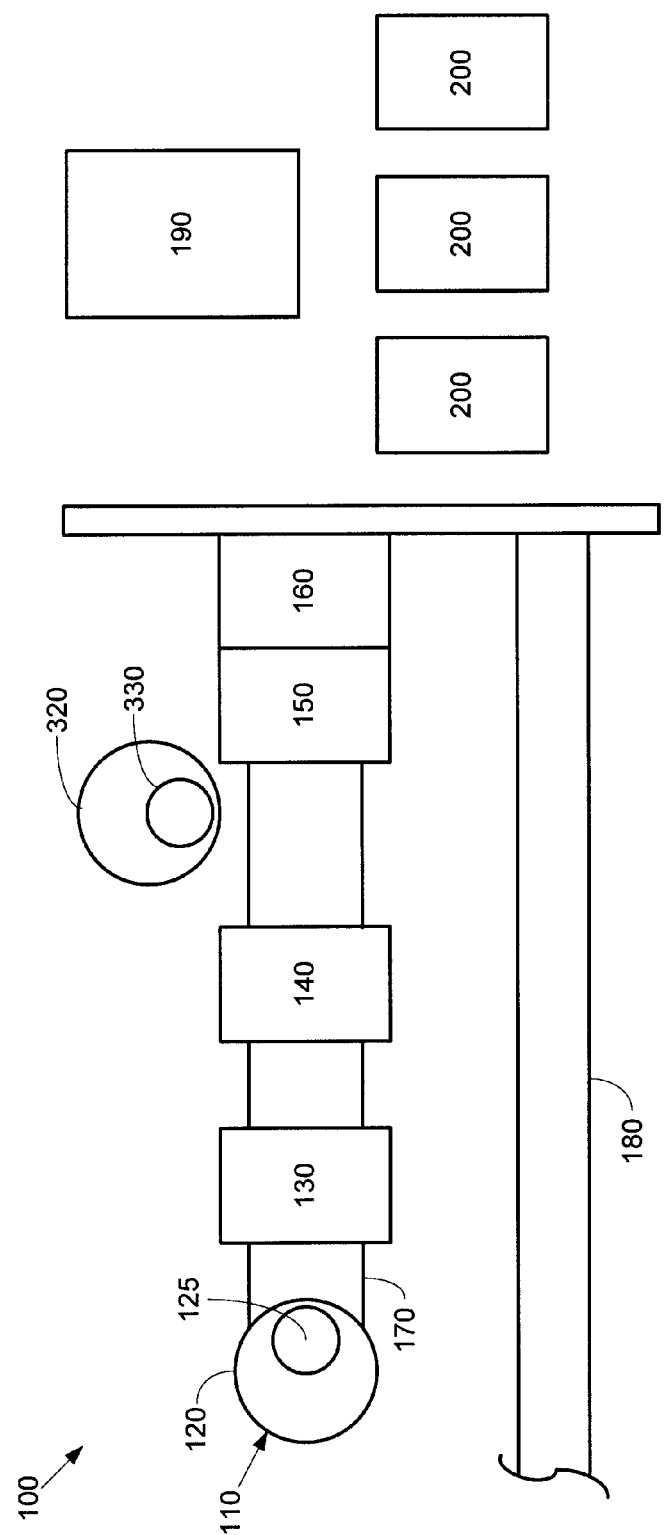
FIG. 1 is a schematic diagram of an example of a beverage dispensing system as may be described herein.

Referring now to the drawings, in which like numerals refer to like elements throughout the several views, FIG. 1 shows an example of a beverage dispensing system 100 as may be described herein. As will be described in more detail below, the overall beverage dispensing system 100 may include any number of modules or stations 110. These modules or stations 110 described herein need not all be used, need not all be used together, and need not all be used in any particular order. Additional stations 110 and/or other types of components in any configuration may be used herein. Multiple beverage dispensing systems 100 may be used together.

Generally described, the beverage dispensing system 100 may include a cup placement station 120 with a number of cups 125, an ice dispensing station 130, a beverage dispensing station 140, a cup lidding and removal station 150 with a number of lids 155, and a printing station 160. The cups 125 may be any type of container. Other stations 110 and other components may be used herein. Some or all of the stations 110 may be positioned about a dispensing conveyor 170. An outgoing or staging conveyor 180 also may be used. Each of these stations 110 and the other components used herein may be in communications with a control device 190. The control device 190 may be a conventional micro-computer and the like capable of executing programmable commands. The control device 190 may be internal to or removed from the beverage dispensing system 100. The control device 190 may be responsive to instructions or requests from a number of input devices 200. The input devices 200 may be any type of user interface, such as conventional cash registers, order monitoring systems (bump screen), touch screen, point of sale (POS) devices, and similar types of order input devices typically found in quick service restaurants and other types of retail establishments. Instructions or requests may be entered by a crew member, a consumer, or anyone else. Any number of input devices 200 may be used herein. Other components and other configurations may be used herein.

The cups 125 or other types of containers may be transported from station to station herein via the dispensing conveyor 170. The dispensing conveyor 170 may be a conventional timing belt or other types of transport devices. A number of cup holders or pucks 210 may be positioned on the dispensing conveyor 170. The pucks 210 may include a number of walls 220 extending in a direction perpendicular or parallel (in the case of the back wall of the puck) to that of the advance of the dispensing conveyor 170. The walls 220 may be spaced apart so as to accommodate cups 125 of varying sizes. Advancement of the dispensing conveyor 170 may be controlled by the control device 190. Multiple dispensing conveyors 170 may be used herein. Other components and other configurations may be used herein.

Figure 2:
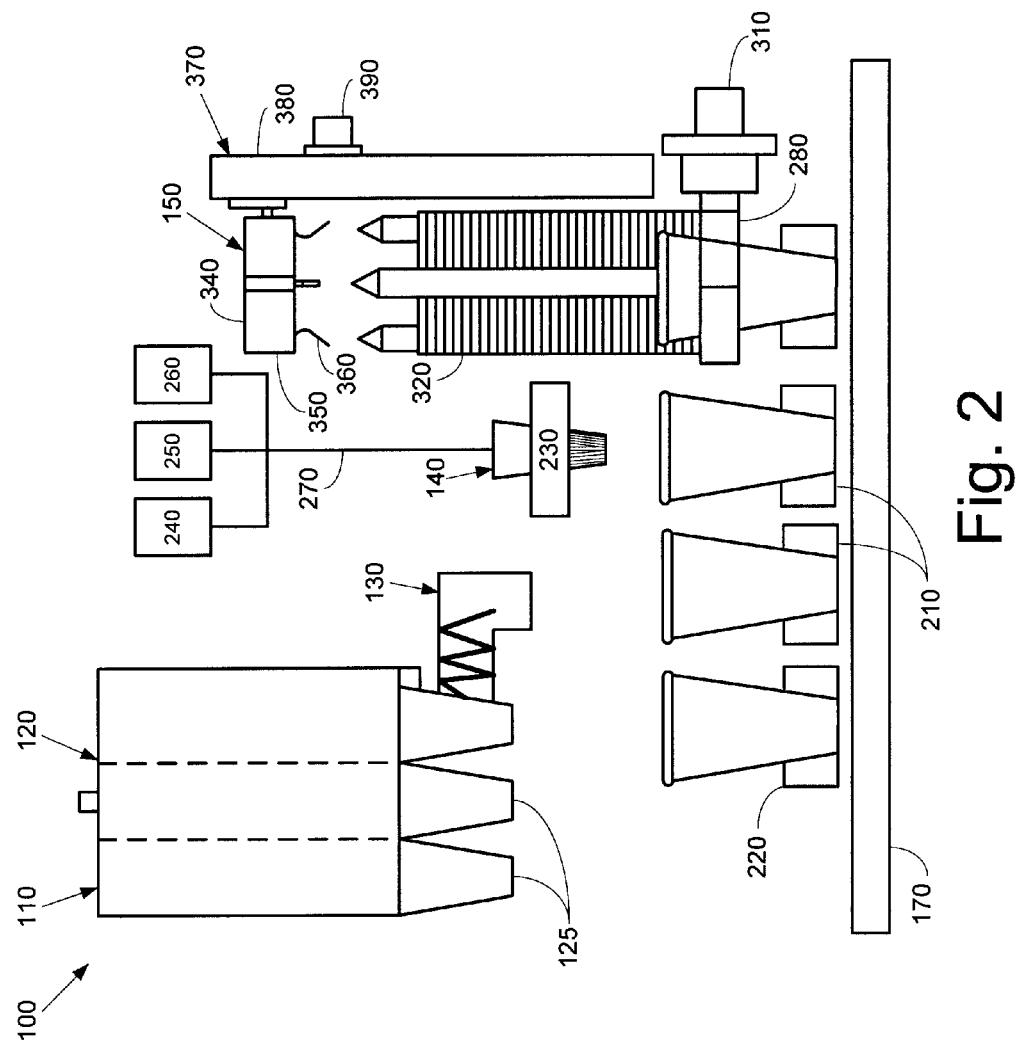
FIG. 2 is a side view of portions of the beverage dispensing system of FIG. 1.

FIGS. 2 and 3 show an example of the beverage dispensing station 140. The dispensing station 140 may be positioned along the dispensing conveyer 170 adjacent to the ice dispensing station 130 or elsewhere. The beverage dispensing station 140 may be a beverage dispensing system such as that described in commonly owned U.S. Pat. No. 7,757,896 described above and incorporated herein. The beverage dispensing station 140 may include a dispensing nozzle 230 for combining a number of micro-ingredients 240, a number of macro-ingredients 250, a diluent 260, and/or other ingredients. The micro-ingredients 240 generally have reconstitution ratios of about ten to one (10:1), twenty to one (20:1), fifty to one (50:1), one hundred to one (100:1), and higher. Examples of the micro-ingredients 240 include natural and artificial flavors, flavor additives, natural and artificial colors, artificial sweeteners, additives for controlling tartness, functional additives, and the like. The macro-ingredients 250 generally have reconstitution ratios in the range of about three to one (3:1) to about six to one (6:1). The macro-ingredients 250 may include sugar, syrup, high fructose corn syrup, juice concentrates, and the like. Various types of these diluents may be used herein, including water, carbonated water, and other fluids.

The micro-ingredients 240, the macro-ingredients 250, and the diluents 260 may be mixed at the dispensing nozzle 230 or elsewhere to form a beverage 270. Example of suitable dispensing nozzles 230 include those described in commonly owned U.S. Pat. No. 7,866,509 B2 to Ziesel, entitled "DISPENSING NOZZLE ASSEMBLY" and commonly owned U.S. Pat. No. 7,578,415 B2 to Ziesel, et al., entitled "DISPENSING NOZZLE ASSEMBLY." U.S. Pat. Nos. 7,866,509 B2 and 7,578,415 B2 are incorporated herein by reference in full. Multiple dispensing nozzles 230 may be used herein. Conventional dispensing nozzles with conventional beverage ingredients also may be used herein. Other components and other configurations also may be used herein.

The cup lidding and removal station 150 may be positioned along the dispensing conveyor 170 adjacent to the beverage dispensing station 140 or elsewhere. The cup lidding and removal station 150 may include a gripper mechanism 280. The gripper mechanism 280 may include a number of gripper jaws 290 that may open and close so as to accept, center, and release the cup 125. The gripper jaws 290 may accommodate cups 125 of differing sizes. The gripper mechanism 280 may be positioned about the dispensing conveyor 170 with the gripper jaws 290 positioned above the height of the walls 220 of the puck 210 so as to grip the cup 125 therein. The gripper mechanism 280 may be mounted onto a gripper positioning device 300. In this example, the gripper positioning device 300 may be in the form of a first horizontal linear actuator 310 and the like. The first horizontal linear actuator 310 may be any type of device that provides substantially horizontal movement. The first horizontal linear actuator 310 may move the gripper mechanism 280 with the cup 125 therein from the dispensing conveyor 170 to the staging conveyor 180 or elsewhere. Other components and other configurations may be used herein.

The cup lidding and removal station 150 also may include one or more lid stacks 320. The lid stacks 320 may have a stack of the lids 330 therein. The cup lidding and removal station 150 may include a lidding mechanism 340. The lidding mechanism 340 may include a base 350 with a number of spring clips 360 extending therefrom. The cup lidding and removal station 150 also may include a positioning device 370 for maneuvering the lidding mechanism 340. The positioning device 370 may include a vertical linear actuator 380 and a second horizontal linear actuator 390. The actuators 380, 390 may be in communication with the lidding mechanism 340. The actuators 380, 390 may be any type of movement device that provides substantially vertical and/or horizontal motion. The base 350 of the lidding mechanism 340 may be attached to the vertical linear actuator 380 for vertical motion while the vertical linear actuator 380 may be attached to the second horizontal linear actuator 390 for horizontal motion. The second horizontal linear actuator 390 may be positioned above the first horizontal linear actuator 310. Other components and other configurations may be used herein.

In use, a cup 125 may drop from the cup station 120 into one of the pucks 210 positioned about the dispensing conveyor 170. The dispensing conveyor 170 may advance the cup 125 to the ice dispensing station 130 to be filled with ice, to the beverage dispensing station 140 to be filled with the beverage 270, to the lidding and removal station 150, and elsewhere. The jaws 290 of the gripper mechanism 280 may grasp and center the cup 125 while the lidding mechanism 340 removes a lid 330 from the stack 320 and positions the lid 330 on a cup 125 via the vertical linear actuator 380 and the second horizontal linear actuator 390. The first horizontal linear actuator 310 then may maneuver the cup 125 through the printing station 160 and to the staging conveyor 180 or elsewhere.

The description of the beverage dispensing system 100 is for the purpose of example only. Many other components and configurations may be used herein. Further, many other types of method steps also may be used herein. All of the method steps and components described herein need not be performed or positioned in any particular order.

Figure 5:
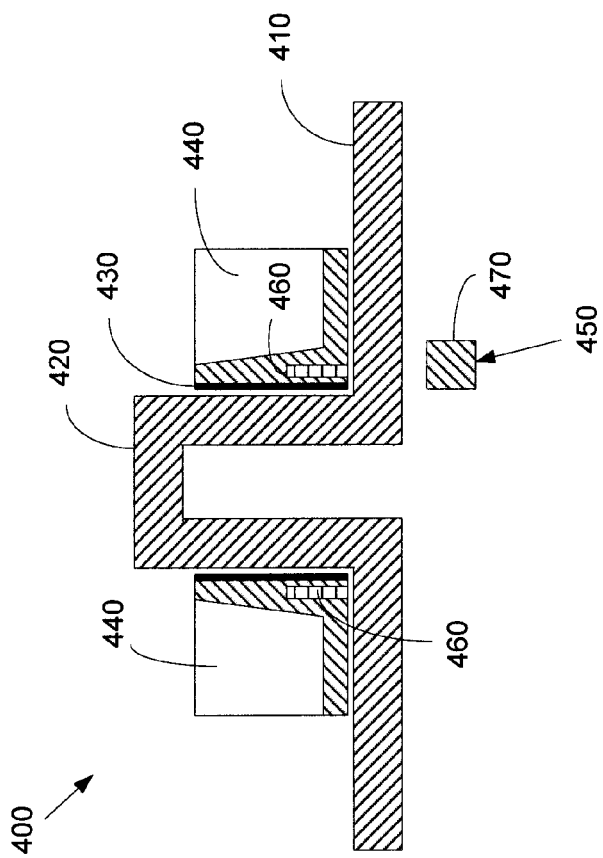
FIG. 5 is a side cross-sectional view of a portion of the magnetic drive system of FIG. 4.
Figure 4:
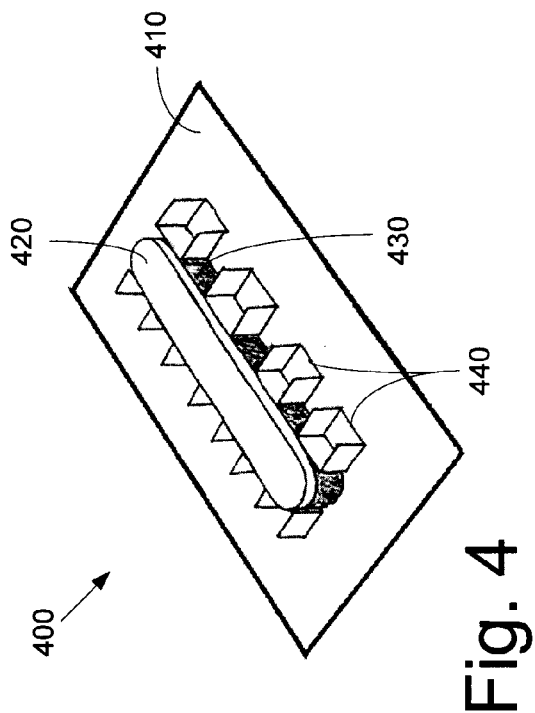
FIG. 4 is a perspective view of a magnetic drive system as may be described herein.

FIGS. 4 and 5 show a magnetic drive system 400 as may be described herein and as may be used with the beverage dispensing system 100 or elsewhere. The magnetic drive system 400 may be used in place of, for example, the dispensing conveyor 170 and the staging conveyor 180 as well as the various actuators 310, 380, 390 and the like. The magnetic drive system 400 may be positioned about a cup transport deck 410. The various stations 110 of the beverage dispenser 100 likewise may be positioned about the cup transport deck 410. The cup transport deck 410 preferably may be a smooth surface with no holes or breaks therein for ease of cleaning. The cup transport deck 410 may include a central core 420. The central core 420 may be a somewhat oblong-shaped portion of the cup transport deck 410 and/or a separate element. A drive belt 430 may be positioned about the central core 420. The drive belt 430 also may be relatively smooth so as to minimize friction with the central core 420. A number of cup holders or pucks 440 may be attached to the drive belt 430. The pucks 440 may be sized to accommodate the cups 125 or other types of containers. Any number of the pucks 440 may be used herein. The pucks 440 may slide along the cup transport deck 410 as driven by the drive belt 430. The drive belt 430 and associated pucks 440 may easily lift off of the central core 420 for cleaning or maintenance.

The magnetic drive system 400 also may include one or more magnetic drive devices 450. The magnetic drive device 450 may include a driven magnet 460 positioned within or about one or more of the pucks 440. The driven magnets 460 may be permanent magnets of any type (e.g., ceramic, alnico, rare earth, etc.). Likewise, one or more drive magnets 470 may be positioned underneath the cup transport deck 410 so as to engage one or more of the driven magnets 460. The drive magnets 470 may be permanent magnets or electromagnets that may be electrically activated in a conventional fashion.

Figure 6:
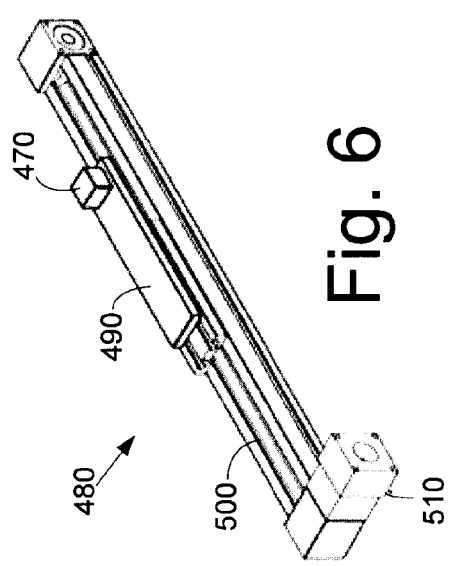
FIG. 6 is a perspective view of a magnetic drive device of the magnetic drive system of FIG. 4.

As is shown in FIG. 6, the drive magnet 470 may be positioned about an actuator 480. The actuator 480 may include a drive plate 490 with the drive magnet 470 thereon. The drive plate 490 may be maneuvered via a drive belt 500 and a motor 510. An example of a suitable actuator 480 may include the "DV Series" of drive belt actuators sold by Del-Tron Precision, Inc. of Bethel, Conn. and the like. Another type of actuator that may be used herein may be a magnetically coupled rodless cylinder sold under the "CY Series" by CMC Corporation of America of Noblesville, Ind. Other types of actuators and other types of drive mechanisms may be used herein.

Figure 7:
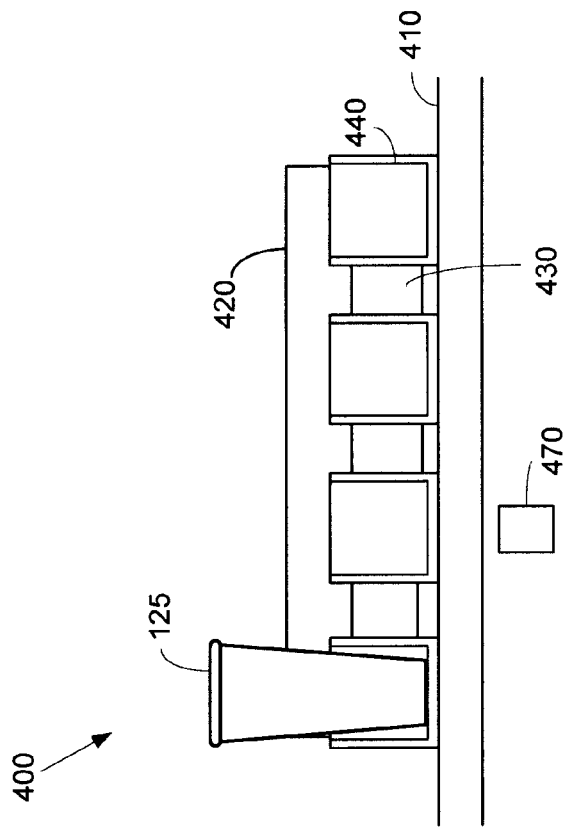
FIG. 7 is a plan view of the magnetic drive system of FIG. 4 in motion.

FIGS. 7-10 show the magnetic drive system 400 in use. In FIG. 7, the drive magnet 460 may be maneuvered beneath the puck 440 positioned about, for example, the ice dispensing station 130. The drive magnet 470 may be turned on so as to magnetically engage the driven magnet 460 in the puck 440 above. In FIG. 8, the actuator 480 then transports the drive magnet 470 and, hence, maneuvers the drive belt 430 with all of the pucks 440 thereon, to the next station. When the drive plate 490 of the actuator 480 reaches the end of its range of travel, the indexing of the puck 440 by one station may be complete. For example, the puck 440 may be moved from the cup placement station 120 to the ice dispensing station 130. The drive magnet 470 then may be turned off such that the actuator 480 may return the drive magnet 470 to its original position. In FIG. 9, the process then may be repeated with the drive magnet 460 again turned on to engage the corresponding driven magnet 460 and the next puck 440. The drive magnet 470 may again move forward as is shown in FIG. 10. Reverse motion also is possible by reversing these steps and directions. Other components and other configurations may be used herein.

FIG. 11 shows a further embodiment of a magnetic drive system 520 as may be described herein and as may be used with the beverage dispensing system 100. The magnetic drive system 520 may be positioned about the cup transport deck 410. Each cup 125 or other type of container may be positioned within a puck 530. The puck 530 may include a circular channel or a similar feature on a top surface thereof so as to prevent the cup 125 from sliding off The puck 530 may advance along the cup transport deck 410 from station to station. The magnetic drive system 520 also may include the magnetic drive device 450 and/or similar components. The magnetic drive device 450 may include the driven magnet 460 positioned within or about the puck 530 with the electromagnetic drive magnet 470 positioned underneath the cup transport deck 410 and maneuverable via the actuator 480. Multiple actuators 480 may be used herein. Other components and other configurations also may be used herein.

FIGS. 12-15 show the magnetic drive system 520 in use. More specifically, the magnetic drive system 520 may maneuver the puck 530 from a first actuator 540 to a second actuator 550. In FIG. 12, the drive magnet 470 of the first actuator 540 is turned on so as to attract the driven magnet 460 within the puck 530. The first actuator 540 then maneuvers the puck 530 along its line of travel. In FIG. 13, the drive magnet 470 of the first actuator 540 may be turned off In FIG. 14, the drive magnet 470 of the second actuator 550 may be moved into positioned under the puck 530. As is shown in FIG. 15, the drive magnet 470 and the second actuator 550 then may be turned on such that the second actuator 550 may maneuver the puck 530 along its line of travel. The actuators 540, 550 may be co-linear or positioned at any respective angle. Any number of the actuators 480 may be used herein. Other components and other configurations may be used herein.

Figure 16A:
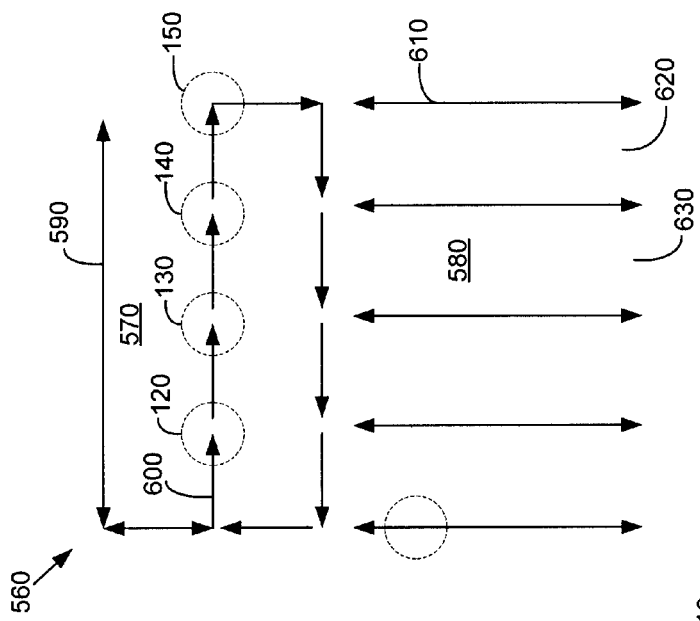
FIG. 16A is a schematic diagram of an alternative embodiment of a beverage dispensing system as may be described herein.
Figure 17:
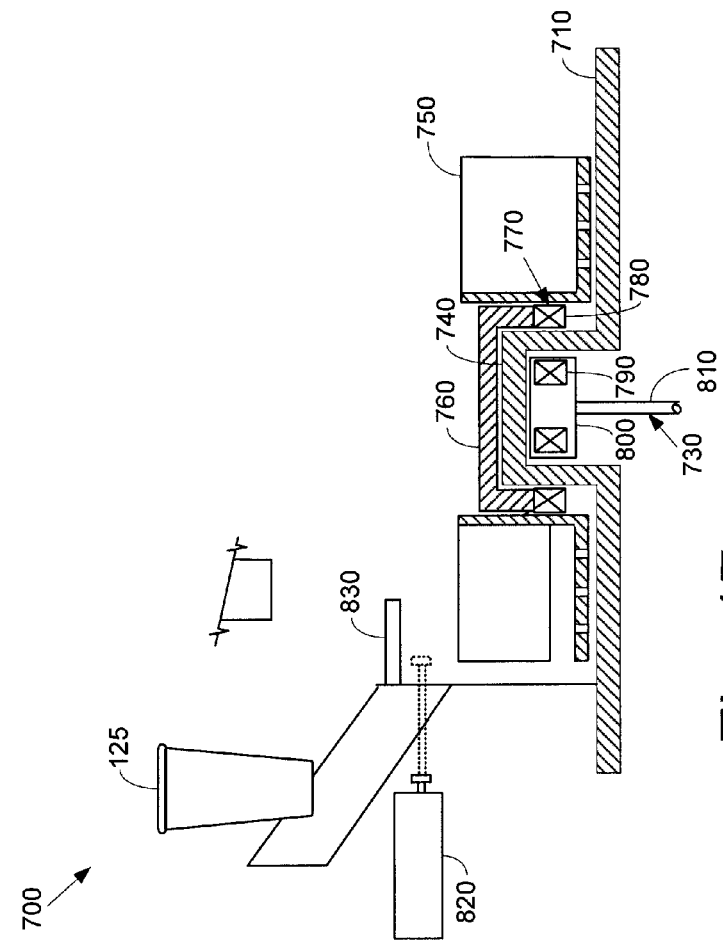
FIG. 17 is a partial side cross-sectional view of an alternative embodiment of a beverage dispensing system as may be described herein.

FIG. 16A shows a further embodiment of a beverage dispensing system 560 as may be described herein. The beverage dispensing system 560 may use the magnetic drive system 520 and the like for positioning the cups 125 or other types of containers along the various stations 110 therein. In this example, the beverage dispensing system 560 may include the cup placement station 120, the ice dispensing station 130, the beverage dispensing station 140, the lidding and removal station 150, and the like. Any number of stations may be used herein in any order. The beverage dispensing system 560 also may include a puck buffer area 570 for storing the pucks 530 and a number of order staging queues 580 for staging the beverages 270. Any number of the magnetic drive devices 450 may be positioned underneath the cup transport deck 410 to position the cups 125 or other containers as desired.

For example, one or more buffer drive devices 590 may maneuver the pucks 530 within the puck buffer area 570, a number of dispensing drive devices 600 may extend along the various stations 110, and a number of staging drive devices 610 may be positioned about the order staging queues 580 to stage the cups 125 according to corresponding orders. In other words, several pucks 530 containing cups 125 from the same customer order may be placed in a first order staging queue 620 while cups 125 related to a second order may be positioned about a second staging queue 630 and so forth.

Figure 16B:
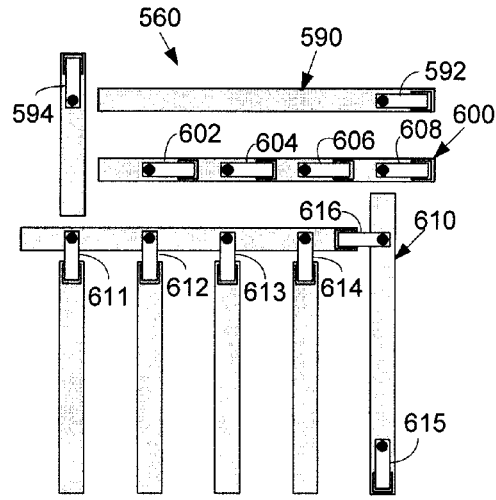
FIG. 16B is a schematic diagram of the beverage dispensing system of FIG. 16A.
Figure 16C:
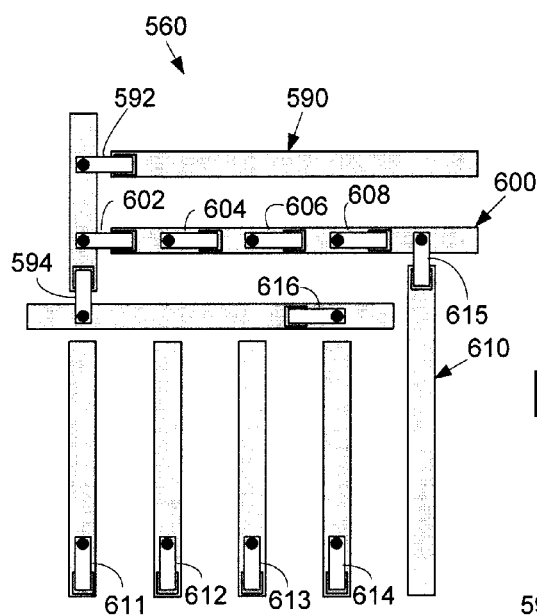
FIG. 16C is a schematic diagram of the beverage dispensing system of FIG. 16A.
Figure 16D:
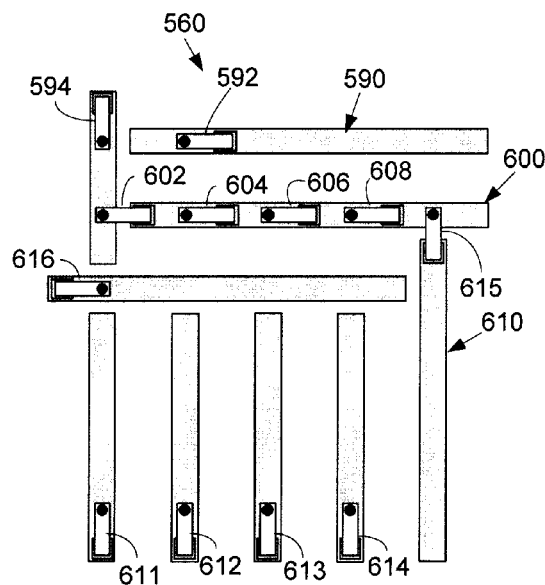
FIG. 16D is a schematic diagram of the beverage dispensing system of FIG. 16A.

FIGS. 16B-16D show the magnetic drive system 520 in operation. Specifically, the buffer drive devices 590 may include a horizontal buffer drive device 592 in communication with a vertical buffer drive device 594. Any number of the buffer drive devices 590 may be used herein. The vertical buffer drive device 594 may be in communication with a first dispenser drive device 602 of the dispensing drive devices 600. The dispensing drive devices 600 also may include a second dispensing drive device 604, a third dispensing drive device 606, and a fourth dispensing drive device 608. Any number of the dispensing drive devices 600 may be used herein. The vertical buffer drive device 594 also may be in communication with a first vertical staging drive device 611 of the staging drive devices 610. The staging drive devices 610 also may include a second vertical staging device 612, a third vertical staging drive device 613, a fourth vertical staging drive device 614, a fifth vertical staging drive device 615, and a horizontal staging drive device 616. Any number of the staging drive devices 610 may be used herein. In this example, the fifth staging drive device 615 may be aligned about the fourth dispensing drive device 608.

In the example of FIG. 16B, the fifth vertical staging drive device 615 is at the end of the first order staging queue while the remaining vertical staging drive devices 611-614 are aligned about the horizontal drive device 616. In FIG. 16C, the first four vertical staging drive devices 611-614 are at the ends of their respective order staging queues 580 while the fifth vertical staging drive device 615 is aligned about the dispensing drive devices 600. Further, the vertical buffer drive device 594 is aligned with the first vertical staging drive device 611. In FIG. 16D, the vertical buffer drive device 594 is aligned with the horizontal buffer drive device 592. Many other configurations may be used herein.

Referring again to FIG. 11, one or more sensors 640 may be positioned along the cup transport deck 410 so as to determine the positioned of the pucks 530 and/or the cups 125. For example, the sensors 640 may be photoelectric or optical sensors 650 that cooperate with one or more light or laser sources 660. The sensors 640 also may be a Hall effect sensor and the like that may detect the magnetic field from the driven magnet 640. Other types of sensors 640 may be used herein. The sensors 640 may detect the presence or absence of a puck 530 and/or a cup 125 therein. The sensors 640 thus may determine when a cup 125 has been removed from a puck 530 or when all of the orders in an order staging queue 580 have been removed such that the pucks 530 may return to the puck buffer area 570. Likewise, colored lights 670 may be positioned underneath the cup transport deck 410 and aligned with each of the order staging queues 580 (if a translucent transport deck 410 is used). The colored lights 670 may be light emitting diodes and the like. Different colored lights may reflect different orders in each of the order staging queues 580. An order screen 680 also may be positioned about each of the order staging queues 580 and/or about each of the pucks 530 to signify an order number. Other components and other configuration may be used herein.

FIGS. 17-23 show a further alternative embodiment of a beverage dispensing system 700 as may be described herein. The beverage dispensing system 700 may have a number of the stations 110 positioned about a cup transport deck 710 in a substantially circular configuration 720. The cup transport deck 710 preferably may be a smooth surface with no holes or breaks therein for ease of cleaning. The beverage dispensing system 700 may include a magnetic drive system 730. The magnetic drive system 730 may be positioned about a central core 740 positioned within the cup transport deck 710. In this example, the central core 740 may have a largely circular shape. The magnetic drive system 730 also may have a number of cup holders or pucks 750. The pucks 750 may be positioned about a central hub 760 for rotation about the central core 740 in a manner similar to the drive belt 430 described above. The central hub 760 may lift off of the central core 740 for cleaning or maintenance.

The magnetic drive system 730 also may include a magnetic drive device 770. Similar to the devices described above, the magnetic drive device 770 may include a number of driven magnets 780. The driven magnets 780 may be positioned about the pucks 750 and/or elsewhere about the central hub 760. The magnetic drive device 770 also may include a number of drive magnets 790. The drive magnets 790 may be positioned about a drive hub 800 and positioned within the central core 740 beneath the central hub 760. The drive hub 800 may be motor driven via an actuator driveshaft 810. Any type of device that provides rotational movement to the actuator driveshaft 810 may be used herein. In use, the drive magnets 790 attract the driven magnets 780. The drive magnets 790 may be permanent magnets or electromagnets. The driven magnets 780 may be permanent magnets. The rotation of the drive hub 800 thus rotates the pucks 750 and the central hub 760 as may be desired from one station to the next.

The beverage dispensing system 700 also may include a number of positioning devices. For example, the cup placement station 120 may include a cup placement actuator 820 that cooperates with a righting spring 830 so as to ensure that the cup 125 or other container is positioned within the puck 750 in the proper orientation. Likewise, a cup ejector 840 also may be positioned about the central hub 760 so as force a cup 125 onto the staging conveyor 180 or elsewhere. Other components and other configurations may be used herein.

Figure 18:
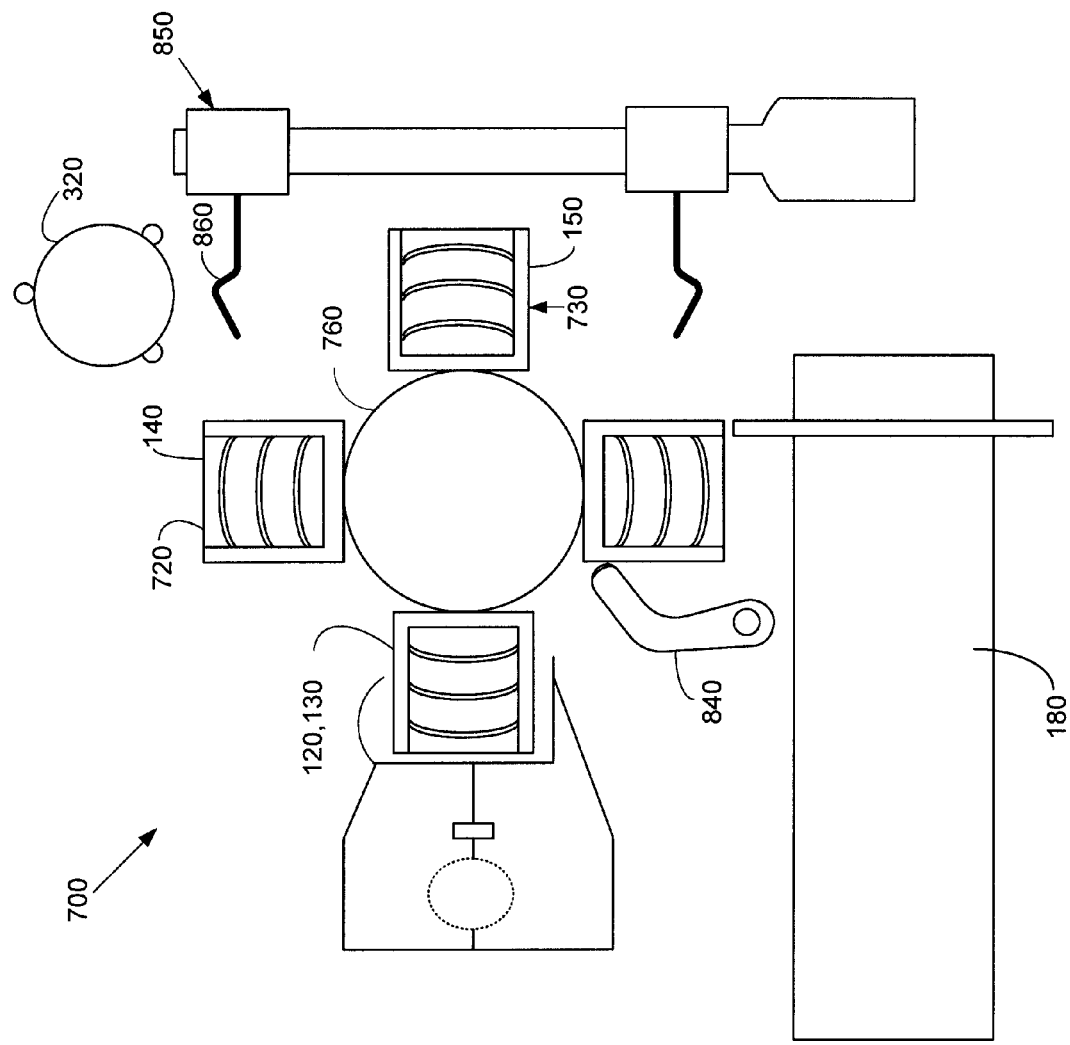
FIG. 18 is a top plan view of the beverage dispensing system of FIG. 17.
Figure 19:
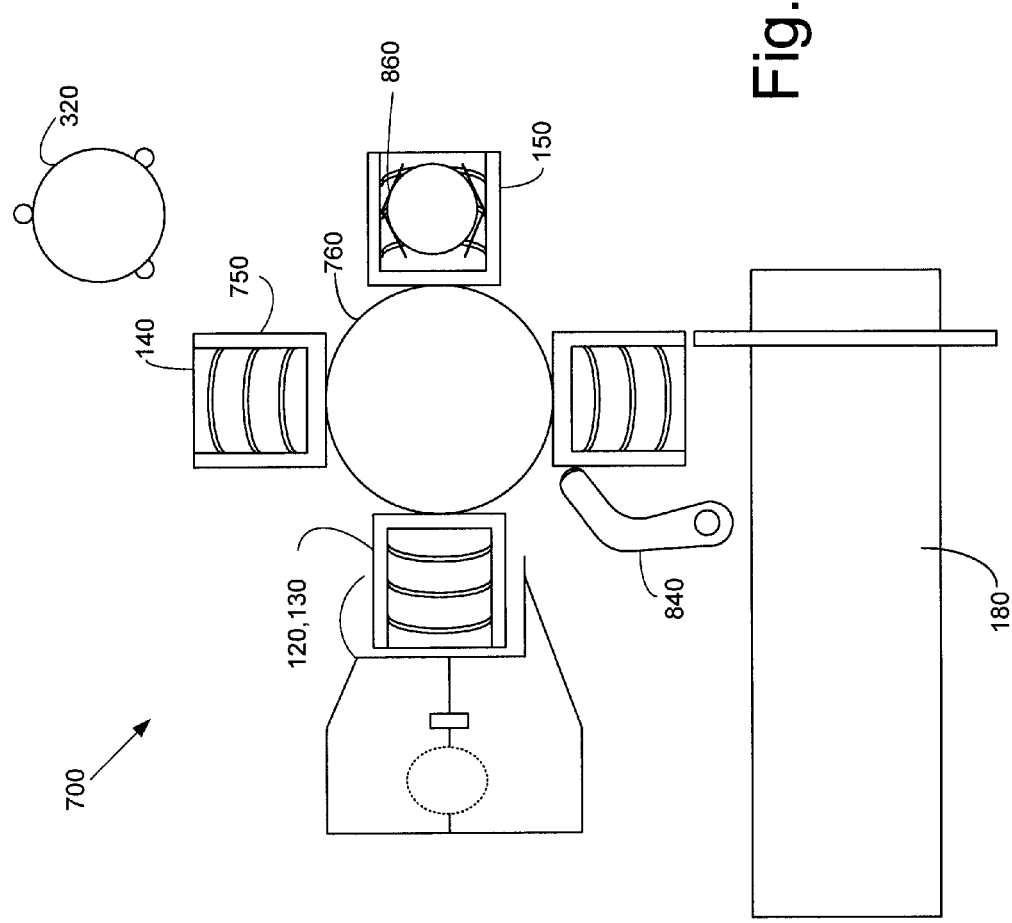
FIG. 19 is a top plan view of the beverage dispensing system of FIG. 17 in use.
Figure 20:
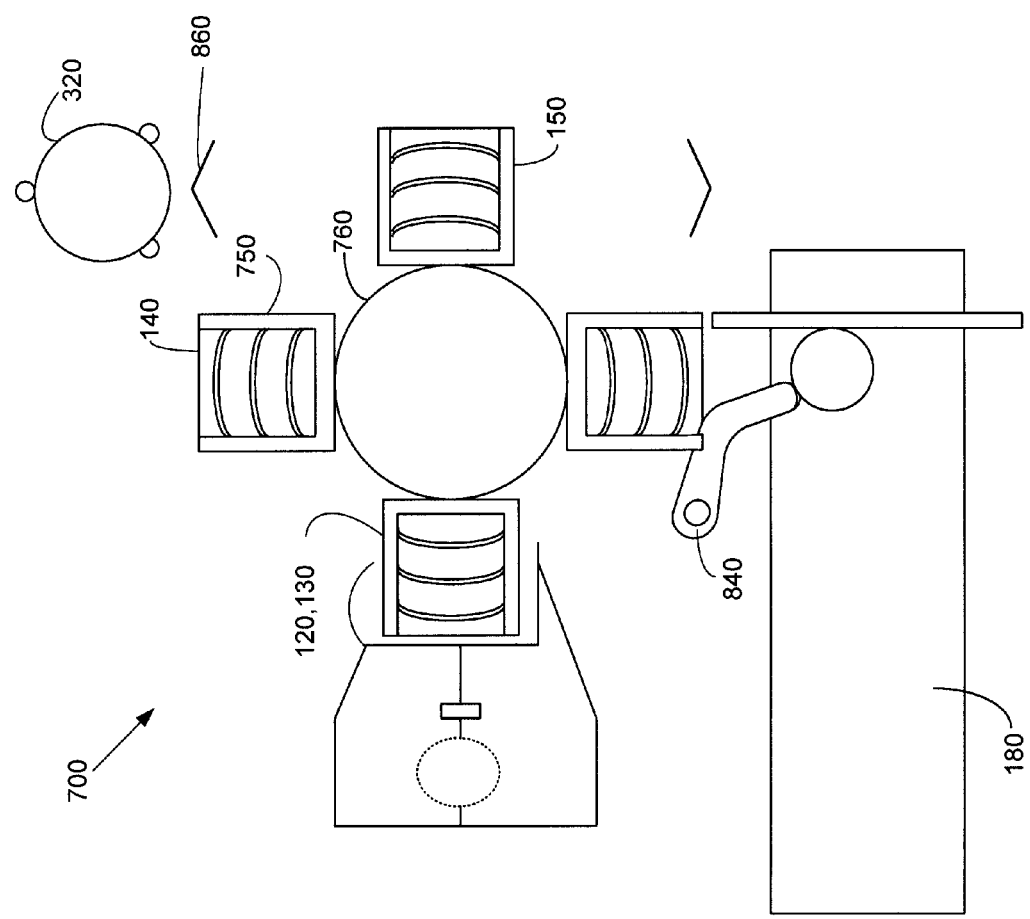
FIG. 20 is a top plan view of the beverage dispensing system of FIG. 17 in use.
Figure 23:
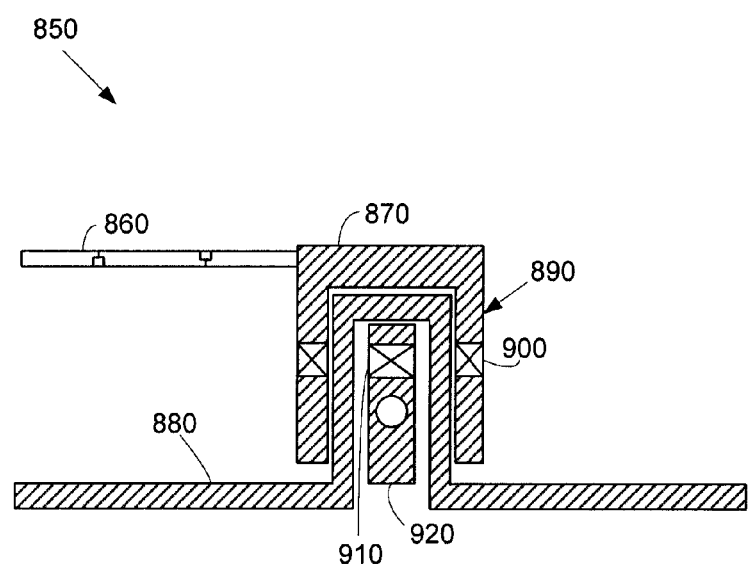
FIG. 23 is a side cross-sectional view of the jaw centering mechanism of FIG. 21.

The beverage dispenser system 700 also may include a gripper mechanism 850 positioned about the lidding and removal station 150 or elsewhere. (In this example, the station to the far right of FIG. 18 is for lidding only.) The gripper mechanism 850 may include a pair of gripper jaws 860. The gripper jaws 860 may be positioned about a support block 870. The support block 870 may be positioned for movement along a gripper core 880. The gripper core 880 may extend from the cup transport deck 710 and may be uniform therewith. The gripper mechanism 850 may lift off of the gripper core 880 for cleaning or maintenance.

The gripper mechanism 850 also may include a magnetic drive device 890. The magnetic drive device 890 may include a driven magnet 900 positioned within or about the support blocks 870. Likewise, the magnetic drive device 890 may include a number of drive magnets 910. The drive magnets 910 may be positioned within or about a drive block 920 or a similar type of support. The drive blocks 920 may be positioned about a left handed lead screw 930 and a right handed lead screw 940. The lead screws 930, 940 may be driven by a screw motor 950 such that when the lead screws 930, 940 rotate, the respective drive blocks 820 and gripper jaws 860 move in opposite directions. Activating the magnetic drive device 890 thus allows the gripper jaws 860 to center a cup 125 or other container as appropriate and also to retract therefrom. Other components and other configurations may be used herein.

The beverage dispensing systems described herein thus provide a beverage or other product in a fast, efficient, and automated fashion. Use of the magnetic drive systems with the magnetic drive devices also ensures easy cleanup and avoids contact between the various fluids used herein and the drive various components. Rather, the components positioned on the cup transport deck 410 may be removed for easy cleaning while the other components underneath the deck remain clean and free from contamination.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A magnetic drive system for maneuvering a container across a deck, comprising:
   a puck to support the container on the deck;
   a driven magnet positioned about the puck;
   an actuator positioned and maneuverable under the deck; and
   a drive magnet positioned about the actuator for attracting the driven magnet and for movement therewith.

2. The magnetic drive system of claim 1, wherein the deck comprises a central core and wherein a plurality of pucks are positioned about a drive mechanism on the central core.

3. The magnetic drive system of claim 2, wherein the drive mechanism comprises a drive belt.

4. The magnetic drive system of claim 2, wherein the drive mechanism comprises a drive hub.

5. The magnetic drive system of claim 2, wherein the drive mechanism may be lifted off of the central core.

6. The magnetic drive system of claim 2, wherein the central core comprises a smooth continuous surface.

7. The magnetic drive system of claim 1, wherein the actuator comprises a drive plate with the drive magnet thereon.

8. The magnetic drive system of claim 1, further comprising a plurality of actuators forming a plurality of pathways.

9. The magnetic drive system of claim 1, wherein the deck comprises a puck buffer area and wherein the actuator comprises a buffer drive.

10. The magnetic drive system of claim 1, wherein the deck comprises a plurality of stations and wherein the actuator comprises a dispensing drive.

11. The magnetic drive system of claim 1, wherein the deck comprises an order staging queue and wherein the actuator comprises a staging drive.

12. The magnetic drive system of claim 11, wherein the deck comprises a plurality of staging queues and wherein each of the plurality of staging queues represents one or more containers from a customer order.

13. The magnetic drive system of claim 1, further comprising a gripper mechanism positioned on the deck.

14. A magnetic drive system for maneuvering a container across a deck, comprising:
   a puck to support the container on the deck;
   a driven magnet positioned about the puck;
   an actuator positioned under the deck;
   a drive magnet positioned about the actuator for attracting the driven magnet and for movement therewith; and
   a gripper mechanism positioned on the deck;
   wherein the gripper mechanism comprises a driven jaw magnet positioned on the deck and a drive jaw magnet positioned underneath the deck.

15. The magnetic drive system of claim 14, wherein the gripper mechanism comprises a drive screw in communication with the drive jaw magnet.

16. A beverage dispensing system for filling a container, comprising:
   a deck;
   a plurality of stations positioned on the deck; and
   a magnetic drive system for maneuvering the container on the deck;
   the magnetic drive system comprising a driven magnet positioned about the container and a drive magnetic positioned and maneuverable under the deck.

17. The beverage dispensing system of claim 16, wherein the magnetic drive system comprises a puck to support the container on the deck and wherein the driven magnet is positioned about the puck.

18. The beverage dispensing system of claim 16, wherein the magnetic drive system comprises an actuator underneath the deck and wherein the drive magnet is positioned about the actuator.

19. A magnetic drive system for centering a container on a deck, comprising:
   a pair of gripper jaws positioned on the deck;
   a pair of driven magnets positioned about the pair of gripper jaws;
   a pair of drive magnets positioned under the deck; and
   a pair of drive screws to maneuver the pair of drive magnets.

20. The magnetic drive system of claim 19, wherein deck comprises a smooth continuous surface and wherein the pair of gripper jaws and the pair of driven magnets may be lifted off of the deck.

* * * * *